(12) United States Patent
Berget et al.

(10) Patent No.: US 9,715,297 B2
(45) Date of Patent: Jul. 25, 2017

(54) FLEXIBLE DISPLAY AND TOUCH DRIVER IC ARCHITECTURE

(71) Applicant: SYNAPTICS INCORPORATED, San Jose, CA (US)

(72) Inventors: Damien Berget, Sunnyvale, CA (US); Joseph Kurth Reynolds, Alviso, CA (US); Stephen L. Morein, San Jose, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 43 days.

(21) Appl. No.: 14/788,562

(22) Filed: Jun. 30, 2015

(65) Prior Publication Data

US 2017/0003785 A1 Jan. 5, 2017

(51) Int. Cl.
*G06F 3/045* (2006.01)
*G06F 3/041* (2006.01)
*G06F 3/044* (2006.01)

(52) U.S. Cl.
CPC .......... *G06F 3/0412* (2013.01); *G06F 3/044* (2013.01); *G06F 2203/04102* (2013.01)

(58) Field of Classification Search
CPC ...... G06F 3/0412; G06F 3/0414; G06F 3/044; G06F 2300/04102
USPC .................................................. 345/173–178
See application file for complete search history.

(56) References Cited

U.S. PATENT DOCUMENTS

| | | | |
|---|---|---|---|
| 7,859,521 B2 | 12/2010 | Hotelling et al. | |
| 8,125,463 B2 | 2/2012 | Hotelling et al. | |
| 8,243,027 B2 | 8/2012 | Hotelling et al. | |
| 8,258,986 B2 | 9/2012 | Makovetskyy | |
| 8,305,359 B2 | 11/2012 | Bolender et al. | |
| 8,723,841 B2 * | 5/2014 | Ishizaki | G06F 3/044 178/18.01 |
| 8,766,950 B1 * | 7/2014 | Morein | G06F 3/044 345/173 |
| 8,860,685 B2 * | 10/2014 | Takeuchi | G06F 3/0418 178/18.06 |
| 9,244,581 B2 * | 1/2016 | Morein | G06F 3/0412 |
| 2003/0052867 A1 | 3/2003 | Shigetaka et al. | |
| 2003/0103043 A1 | 6/2003 | Mulligan et al. | |
| 2003/0234771 A1 | 12/2003 | Mulligan et al. | |
| 2004/0125087 A1 | 7/2004 | Taylor et al. | |
| 2004/0239650 A1 | 12/2004 | Mackey | |
| 2004/0252109 A1 | 12/2004 | Trent et al. | |
| 2005/0030048 A1 | 2/2005 | Bolender et al. | |
| 2006/0114240 A1 | 6/2006 | Lin | |
| 2006/0114241 A1 | 6/2006 | Lin | |
| 2007/0229466 A1 | 10/2007 | Peng et al. | |
| 2007/0229468 A1 | 10/2007 | Peng et al. | |
| 2007/0229469 A1 | 10/2007 | Seguine | |
| 2007/0229470 A1 | 10/2007 | Snyder et al. | |
| 2008/0062140 A1 | 3/2008 | Hotelling et al. | |

(Continued)

*Primary Examiner* — Vijay Shankar
(74) *Attorney, Agent, or Firm* — Patterson + Sheridan, LLP

(57) ABSTRACT

A display and touch driver architecture is described that includes a plurality of source drivers and a processing system. The processing system operates receivers within the source drivers to selectively receive sensing data from the receivers and determines positional information based on the sensing data. The processing system may selectively operate different source drivers in low power modes and/or for capacitive sensing based on the determined positional information.

20 Claims, 7 Drawing Sheets

(56) References Cited

U.S. PATENT DOCUMENTS

| | | |
|---|---|---|
| 2008/0062147 A1 | 3/2008 | Hotelling et al. |
| 2008/0246723 A1 | 10/2008 | Baumbach |
| 2010/0001973 A1 | 1/2010 | Hotelling et al. |
| 2010/0144391 A1 | 6/2010 | Chang et al. |
| 2010/0193257 A1 | 8/2010 | Hotelling et al. |
| 2010/0194695 A1 | 8/2010 | Hotelling et al. |
| 2010/0194697 A1 | 8/2010 | Hotelling et al. |
| 2010/0302202 A1* | 12/2010 | Takeuchi ............ G06F 3/0418 345/174 |
| 2010/0328259 A1* | 12/2010 | Ishizaki ................ G06F 3/044 345/174 |
| 2011/0006999 A1 | 1/2011 | Chang et al. |
| 2011/0007030 A1 | 1/2011 | Mo et al. |
| 2011/0025635 A1 | 2/2011 | Lee |
| 2011/0242444 A1 | 10/2011 | Song |
| 2011/0248949 A1 | 10/2011 | Chang et al. |
| 2011/0298746 A1 | 12/2011 | Hotelling |
| 2012/0038585 A1 | 2/2012 | Kim |
| 2012/0043971 A1 | 2/2012 | Maharyta |
| 2012/0044171 A1 | 2/2012 | Lee et al. |
| 2012/0081335 A1 | 4/2012 | Land et al. |
| 2012/0218199 A1 | 8/2012 | Kim et al. |
| 2013/0057507 A1 | 3/2013 | Shin et al. |
| 2013/0088372 A1 | 4/2013 | Lundstrum et al. |
| 2013/0162570 A1 | 6/2013 | Shin et al. |
| 2013/0215075 A1 | 8/2013 | Lee et al. |
| 2013/0321296 A1 | 12/2013 | Lee et al. |
| 2013/0342770 A1 | 12/2013 | Kim et al. |
| 2015/0002466 A1* | 1/2015 | Takeuchi ............ G06F 3/0418 345/174 |
| 2015/0309531 A1* | 10/2015 | Tanemura ................ G06F 1/16 345/174 |

\* cited by examiner

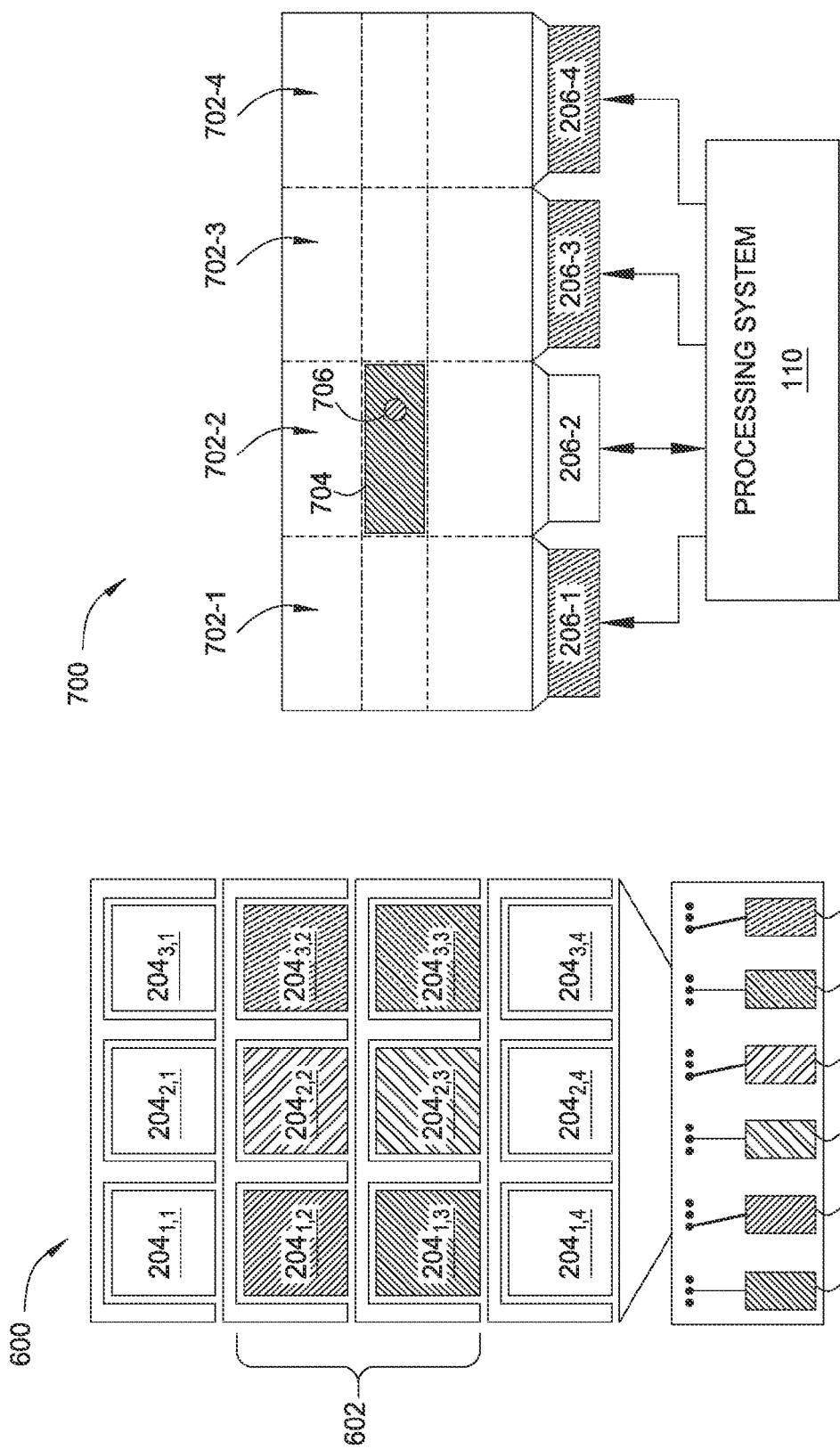

FLEXIBLE DISPLAY AND TOUCH DRIVER IC ARCHITECTURE

BACKGROUND

Field of the Disclosure

Embodiments generally relate to input sensing and, in particular, to a sensing device having a circular electrode design for capacitance sensing.

Description of the Related Art

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location, and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY

Embodiments of the present disclosure provide an integrated display device and capacitive sensing device having a plurality of sensor electrodes and a processing system. Each of the plurality of sensor electrodes includes at least one display electrode configured for display updating and capacitive sensing. The processing system includes a first source driver coupled to a first sensor electrode of the plurality of sensor electrodes and configured to receive first sensing data from the first sensor electrode, and a second source driver coupled to a second sensor electrode of the plurality of sensor electrodes and configured to receive second sensing data from the second sensor electrode. The processing system is configured to determine positional information for an input object based on the first sensing data and the second sensing data, and operate the first source driver to drive the first sensor electrode for capacitive sensing and the second source driver in a low power mode based on the positional information.

Another embodiment of the present disclosure provides a processing system for an integrated display device and capacitive sensing device. The processing system includes a first source driver coupled to a first sensor electrode of a plurality of sensor electrodes and configured to receive first sensing data from the first sensor electrode, and a second source driver coupled to a second sensor electrode of a plurality of sensor electrodes and configured to receive second sensing data from the second sensor electrode. The processing system further includes a determination module configured to determine positional information for an input object based on the first sensing data and the second sensing data, and operate the first source driver to drive the first sensor electrode for capacitive sensing and the second source driver in a low power mode based on the positional information.

Embodiments of the present disclosure provide a method for operating an input device. The method includes receiving first sensing data from a first sensor electrode using a first source driver coupled to the first sensor electrode, and receiving second sensing data from a second sensor electrode using a second source driver coupled to the second sensor electrode. The first and second sensor electrodes each include at least one display electrode configured for display updating and capacitive sensing. The method further includes determining positional information for an input object based on the first sensing data and the second sensing data, and operating the first source driver to drive the first sensor electrode for capacitive sensing and the second source driver in a low power mode based on the positional information.

BRIEF DESCRIPTION OF THE DRAWINGS

So that the manner in which the above recited features of embodiments can be understood in detail, a more particular description of embodiments, briefly summarized above, may be had by reference to embodiments, some of which are illustrated in the appended drawings. It is to be noted, however, that the appended drawings illustrate only typical embodiments and are therefore not to be considered limiting of scope, for other effective embodiments may be admitted.

FIG. 6 is a block diagram depicting operations for focus acquisitions of capacitive measurements, according to one embodiment of the present disclosure.

FIG. 7 is a block diagram depicting a power-saving scheme for operating the capacitive sensor device, according to an embodiment of the present disclosure.

To facilitate understanding, identical reference numerals have been used, where possible, to designate identical elements that are common to the figures. It is contemplated that elements of one embodiment may be beneficially incorporated in other embodiments.

DETAILED DESCRIPTION

The following detailed description is merely exemplary in nature and is not intended to limit the embodiments or the application and uses of such embodiments. Furthermore, there is no intention to be bound by any expressed or implied theory presented in the preceding technical field, background, brief summary or the following detailed description.

Figure 1:
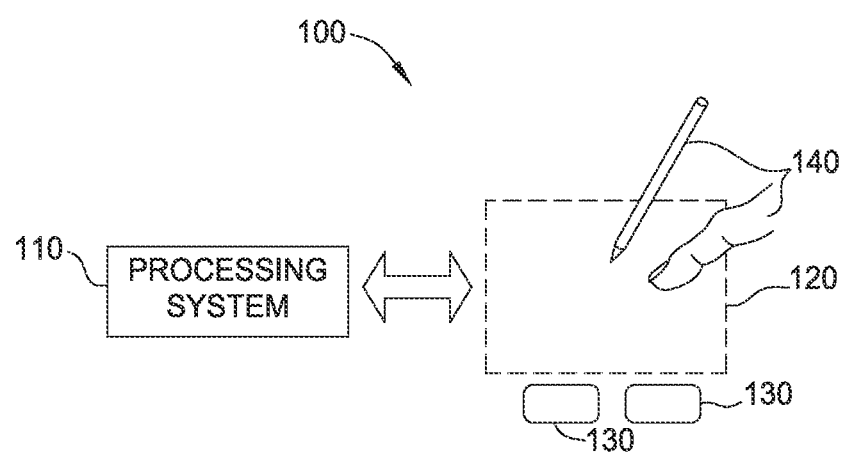
FIG. 1 is a block diagram of a system that includes an input device according to an example.

Turning now to the figures, FIG. 1 is a block diagram of an exemplary input device 100, in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system or can be physically separate from the electronic system. As appropriate, the input device 100 may communicate with parts of the electronic system using any one or more of the following: buses, networks, and other wired or wireless interconnections. Examples include I²C, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in, and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g., a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques. Some implementations are configured to provide images that span one, two, three, or higher dimensional spaces. Some implementations are configured to provide projections of input along particular axes or planes. In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, changing the measured capacitive coupling. In one implementation, an absolute capacitance sensing method operates by modulating sensor electrodes with respect to a reference voltage (e.g., system ground) and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals and/or to one or more sources of environmental interference (e.g., other electromagnetic signals). Sensor electrodes may be dedicated transmitters or receivers, or sensor electrodes may be configured to both transmit and receive. Alternatively, the receiver electrodes may be modulated relative to ground.

In FIG. 1, a processing system 110 is shown as part of the input device 100. The processing system 110 is configured to operate the hardware of the input device 100 to detect input in the sensing region 120. The processing system 110 comprises parts of, or all of, one or more integrated circuits (ICs) and/or other circuitry components. For example, a processing system for a mutual capacitance sensor device may comprise transmitter circuitry configured to transmit signals with transmitter sensor electrodes and/or receiver circuitry configured to receive signals with receiver sensor electrodes. In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100 and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g., to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120 or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
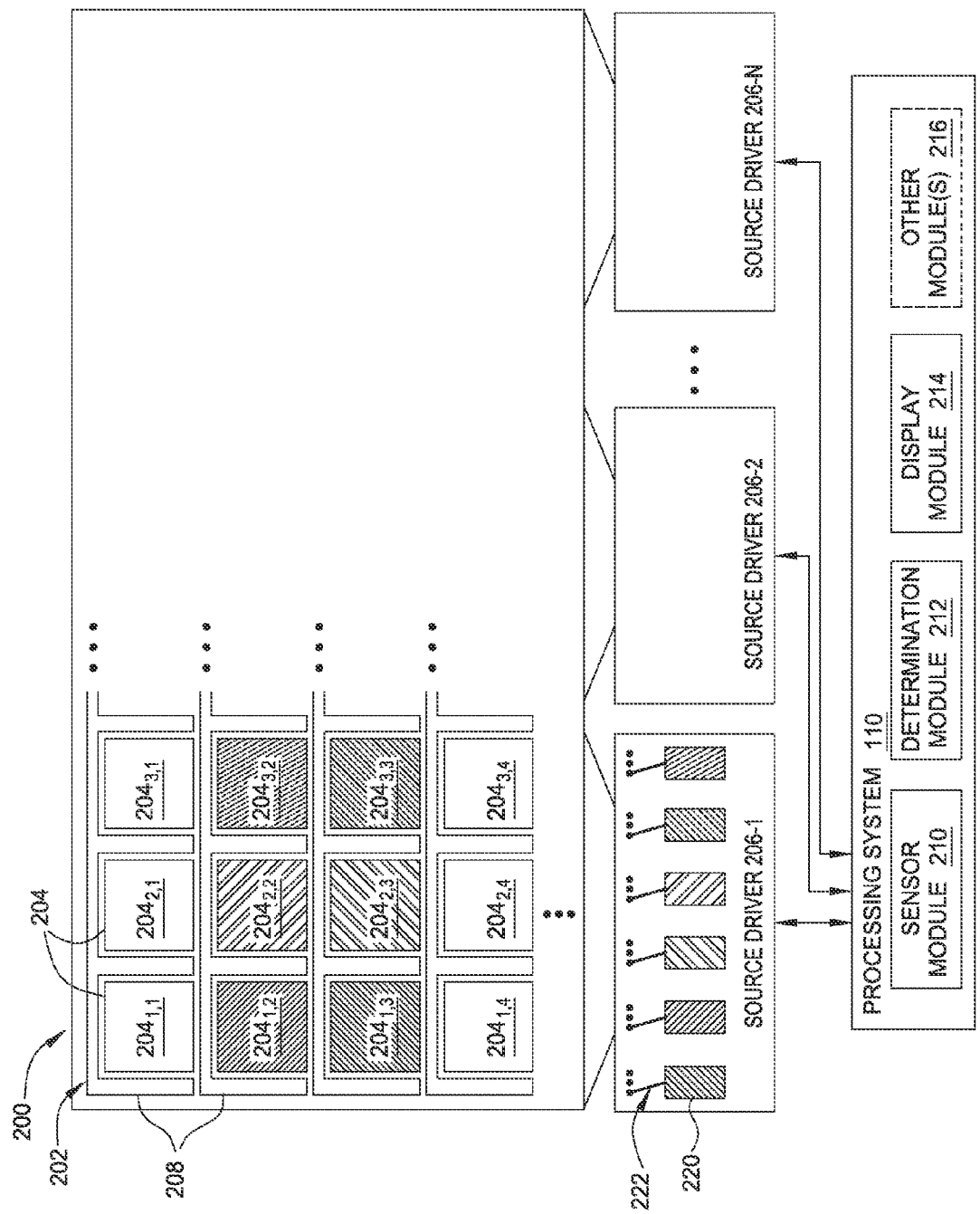
FIG. 2 is a block diagram depicting a capacitive sensor device according to an embodiment of the present disclosure.

FIG. 2 is a block diagram depicting a capacitive sensor device 200 according to an embodiment of the present disclosure. The capacitive sensor device 200 comprises an example implementation of the input device 100 shown in FIG. 1. The capacitive sensor device 200 includes a sensor electrode pattern 202 coupled to an example implementation of the processing system 110. The sensor electrode pattern 202 includes a plurality of sensor electrodes $204_{J,K}$ (referred to collectively as sensor electrodes 204) disposed on a substrate. In some embodiments, the sensor electrode pattern 202 includes the plurality of sensor electrodes 204 disposed in a rectangular matrix, specifically, arranged in J rows and K columns, where J and K are positive integers, although one or J and K may be zero. For clarity of illustration and description, FIG. 2 presents the sensor electrodes 204 in a matrix of rectangles with grid electrodes 208 disposed therebetween and does not show various components in detail, such as various interconnects between the processing system 110 and the sensing elements. While the sensor electrodes are depicted as being arranged in a matrix array, it is contemplated that the pattern of sensing electrodes 204 may comprise a plurality of sensor electrodes 204 having other configurations, such as columns and rows, polar arrays, repeating patterns, non-repeating patterns, a single row or column, or other suitable arrangement. The sensor electrodes 204 may be any shape such as circular, rectangular, diamond, star, square, etc. In one embodiment, the sensor electrodes 204 may have a common shape and size. In some embodiments, the grid electrode 208 may be arranged to not completely surround each sensor electrode 204, as depicted in FIG. 2, or in other embodiments, may be arranged to fully surround each sensor electrode 204.

The sensor electrodes 204 are typically ohmically isolated from each other, and also ohmically isolated from the grid electrode(s) 208. That is, one or more insulators separate the sensor electrodes 204 (and grid electrode 208) and prevent them from electrically shorting to each other. In some embodiments, the sensor electrodes 204 and grid electrode 208 are separated by an insulative gap. The insulative gap separating the sensor electrodes 204 and grid electrode 208 may be filled with an electrically insulating material, or may be an air gap. In some embodiments, the sensor electrodes 204 and the grid electrode 208 are vertically separated by one or more layers of insulative material. In some other embodiments, the sensor electrodes 204 and the grid electrode 208 are separated by one or more substrates; for example, they may be disposed on opposite sides of the same substrate, or on different substrates. In yet other embodiments, the grid electrode 208 may be composed of multiple layers on the same substrate, or on different substrates. In one embodiment, a first grid electrode may be formed on a first substrate or first side of a substrate and a second grid electrode may be formed on a second substrate or a second side of a substrate. For example, a first grid comprises one or more common electrodes disposed on a TFT layer of the display device 160 and a second grid electrode is disposed on the color filter glass of the display device 160. In one embodiment, the dimensions of the first grid electrode are equal to the dimensions of the second grid electrode. In one embodiment, at least one dimension of the first grid electrode differs from a dimension of the second grid electrode. For example, the first grid electrode may be configured such that is disposed between a first and second sensor electrode 204 and the second grid electrode may be configured such that it overlaps at least one of the first and second sensor electrodes 204 and the first grid electrode. Further, the first grid electrode may be configured such that it is disposed between a first and second sensor electrode 204 and the second grid electrode may be configured such that it only overlaps the first grid electrode and is smaller than the first grid electrode.

The processing system 110 is coupled to the sensor electrodes 204 through the conductive routing traces to implement the sensing region 120 for sensing inputs. Each of the sensor electrodes 204 can be coupled to at least one routing trace of the routing traces. The processing system 110 can also be coupled to the grid electrode 208 through one or more routing traces. The processing system 110 is coupled to the sensor electrodes 204 through the conductive routing traces to implement the sensing region 120 for sensing inputs.

The capacitive sensor device 200 can be utilized to communicate user input (e.g., a user's finger, a probe such as a stylus, and/or some other external input object) to an electronic system (e.g., computing device or other electronic device). For example, the capacitive sensor device 200 can be implemented as a capacitive touch screen device that can be placed over an underlying image or information display device (not shown). In this manner, a user would view the underlying image or information display by looking through substantially transparent elements in the sensor electrode pattern 202. When implemented in a touch screen, the substrate can include at least one substantially transparent layer. The sensor electrodes and the conductive routing traces can be formed of substantially transparent conductive material. Indium tin oxide (ITO) and/or thin, barely visible wires are but two of many possible examples of substantially transparent material that can be used to form the sensor electrodes and/or the conductive routing traces. In other examples, the conductive routing traces can be formed of non-transparent material, and then hidden in a border region of the sensor electrode pattern 202.

In another example, the capacitive sensor device 200 can be implemented as a capacitive touchpad, slider, button, or other capacitance sensor. For example, the substrate can be implemented with, but not limited to, one or more clear or opaque materials. Likewise, clear or opaque conductive materials can be utilized to form sensor electrodes and/or conductive routing traces for the sensor electrode pattern 202.

In general, the processing system 110 excites or drives sensing elements of the sensor electrode pattern 202 with a sensing signal and measures an induced or resulting signal that includes the sensing signal and effects of input in the sensing region 120. The terms "excite" and "drive" as used herein encompasses controlling some electrical aspect of the driven element. For example, it is possible to drive current through a wire, drive charge into a conductor, drive a substantially constant or varying voltage waveform onto an electrode, etc. A sensing signal can be constant, substantially constant, or varying over time, and generally includes a shape, frequency, amplitude, and phase. A sensing signal can be referred to as an "active signal" as opposed to a "passive signal," such as a ground signal or other reference signal. A sensing signal can also be referred to as a "transmitter signal" when used in transcapacitive sensing, or an "absolute sensing signal" or "modulated signal" when used in absolute sensing.

In an example, the processing system 110 drives sensing element(s) of the sensor electrode pattern 202 with a voltage and senses resulting respective charge on sensing element(s). That is, the sensing signal is a voltage signal and the resulting signal is a charge signal (e.g., a signal indicative of accumulated charge, such as an integrated current signal). Capacitance is proportional to applied voltage and inversely proportional to accumulated charge. The processing system 110 can determine measurement(s) of capacitance from the sensed charge. In another example, the processing system 110 drives sensing element(s) of the sensor electrode pattern 202 with charge and senses resulting respective voltage on sensing element(s). That is, the sensing signal is a signal to cause accumulation of charge (e.g., current signal) and the resulting signal is a voltage signal. The processing system 110 can determine measurement(s) of capacitance from the sensed voltage. In general, the term "sensing signal" is meant to encompass both driving voltage to sense charge and driving charge to sense voltage, as well as any other type of signal that can be used to obtain indicia of capacitance. "Indicia of capacitance" include measurements of charge, current, voltage, and the like, from which capacitance can be derived.

The processing system 110 can include a sensor module 210, a determination module 212, a display module 214, and other module(s) 216. The sensor module 210 and the determination module 212 comprise modules that perform different functions of the processing system 110. In other examples, different configurations of one or more other modules 216 can perform the functions described herein. The sensor module 210 and the determination module 212 can include circuitry and can also include firmware, software, or a combination thereof operating in cooperation with the circuitry.

The sensor module 210 selectively drives sensing signal(s) on one or more sensing elements of the sensor electrode pattern 202 over one or more cycles ("excitation cycles") in accordance with one or more schemes ("excitation schemes"). During each excitation cycle, the sensor module 210 can selectively sense resulting signal(s) from one or more sensing elements of the sensor electrode pattern 202. Each excitation cycle has an associated time period during which sensing signals are driven and resulting signals measured.

In one type of excitation scheme, the sensor module 210 can selectively drive sensing elements of the sensor electrode pattern 202 for absolute capacitive sensing. In absolute capacitive sensing, the sensor module 210 can measure voltage, charge, or current on sensor electrode(s) 204 to obtain resulting signals indicative of a capacitance between the sensor electrode(s) 204 and an input object. In such an excitation scheme, measurements of absolute capacitance between the selected sensing element(s) and input object(s) are determined from the resulting signal(s).

In another type of excitation scheme, the sensor module 210 can selectively drive sensing elements of the sensor electrode pattern 202 for transcapacitive sensing. In transcapacitive sensing, the sensor module 210 drives selected transmitter sensor electrodes with transmitter signal(s) and senses resulting signals from selected receiver sensor electrodes. In such an excitation scheme, measurements of transcapacitance between transmitter and receiver electrodes are determined from the resulting signals. In an example, the sensor module 210 can drive selected sensor electrodes 204 with transmitter signal(s), and receive resulting signals from others of the sensor electrodes 204.

In any excitation cycle, the sensor module 210 can drive sensing elements of the sensor electrode pattern 202 with other signals, including reference signals and guard signals. That is, those sensing elements of the sensor electrode pattern 202 that are not driven with a sensing signal, or sensed to receive resulting signals, can be driven with a reference signal, a guard signal, or left floating (i.e., not driven with any signal). A reference signal can be a ground signal (e.g., system ground) or any other constant or substantially constant voltage signal. A guard signal can be a signal that is similar or the same in at least one of shape, amplitude, frequency, or phase of a transmitter signal.

"System ground" may indicate a common voltage shared by system components. For example, a capacitive sensing system of a mobile phone can, at times, be referenced to a system ground provided by the phone's power source (e.g., a charger or battery). The system ground may not be fixed relative to earth or any other reference. For example, a mobile phone on a table usually has a floating system ground. A mobile phone being held by a person who is strongly coupled to earth ground through free space may be grounded relative to the person, but the person-ground may be varying relative to earth ground. In many systems, the system ground is connected to, or provided by, the largest area electrode in the system. The capacitive sensor device 200 can be located proximate to such a system ground electrode (e.g., located above a ground plane or backplane).

In some touch screen embodiments, one or more of the sensor electrodes 204 comprise one or more display electrodes used in updating the display of the display screen. The display electrodes may comprise one or more elements of the Active Matrix display such as one or more segments of a segmented Vcom electrode (common electrode(s)), a source drive line, gate line, an anode sub-pixel electrode or cathode pixel electrode, or any other display element. These display electrodes may be disposed on an appropriate display screen substrate. For example, the common electrodes may be disposed on the a transparent substrate (a glass substrate, TFT glass, or any other transparent material) in some display screens (e.g., In Plane Switching (IPS), Fringe Field Switching (FFS) or Plane to Line Switching (PLS) Organic Light Emitting Diode (OLED)), on the bottom of the color filter glass of some display screens (e.g., Patterned Vertical Alignment (PVA) or Multi-domain Vertical Alignment (MVA)), over an emissive layer (OLED), etc. In such embodiments, the display electrode can also be referred to as a "combination electrode", since it performs multiple functions. In various embodiments, each of the sensor electrodes 204 comprises one or more common electrodes. In other embodiments, at least two sensor electrodes 204 may share at least one common electrode. While the following description may describe that sensor electrodes 204 and/or grid electrode 208 comprise one or more common electrodes, various other display electrodes as describe above may also be used in conjunction with the common electrode or as an alternative to the common electrodes. In various embodiments, the sensor electrodes 204 and grid electrode 208 comprise the entire common electrode layer (Vcom electrode).

Measurement(s) of capacitance by the processing system 110, such as capacitive image(s) or capacitive profile(s), enable the sensing of contact, hovering, or other user input with respect to the formed sensing regions by the sensor electrode pattern 202. The determination module 212 can utilize the measurements of capacitance to determine positional information with respect to a user input relative to the sensing regions formed by the sensor electrode pattern 202. The determination module 212 can additionally or alternatively use such measurement(s) to determine input object size and/or input object type.

In one or more embodiments, the capacitive sensor device 200 includes a plurality of source drivers 206 (i.e., 206-1, 206-2, . . . 206-N) configured to generate signals to drive display electrodes and other components (e.g., pixel elements) of the capacitive sensor device 200 for display. In some embodiments, the source drivers 206 are directed mounted on the same substrate (e.g., glass) as the sensor electrode pattern 202. The source drivers 206 may include a display driver that provides an interface for driving source lines for updating the voltage stored across pixels.

Each source driver 206 is coupled to one or more sensor electrodes 204 and is configured to sensing data from the sensor electrodes 204. Each sensor electrode 204 may include at least one display electrode configured for display updating and capacitive sensing. In one embodiment, each source driver 206 includes a plurality of receivers 220. A receiver 220 may be selectively coupled to one or more sensor electrodes with selection circuitry 222, such as multiplexers. For example, a first receiver in a first source driver 206-1 may be selectively coupled to a particular sensor electrode 204 to receive sensing data from that sensor electrode 204. In the particular embodiment shown in FIG. 2, the receivers 220 are integrated into one or more source drivers 206 that are coupled to the sensor electrodes 204, although the receivers may be part of other components, e.g., the sensor module 210, the processing system 110. A variety of sensing patterns and schemes for acquiring sensing data and tracking input objects are described in greater detail below.

In one embodiment, the determination module 212 of the processing system 110 is configured to determine positional information for an input object 140 based on the sensing data received from the source drivers (e.g., from the receivers 220). The processing system 110 is further configured to selectively operate each source driver 206 individually. For example, the processing system 110 may operate a first source driver 206-1 to drive a sensor electrode 204 for capacitive sensing, and then operate a second source driver 206-2 in a low power mode based on that positional information.

Figure 3:
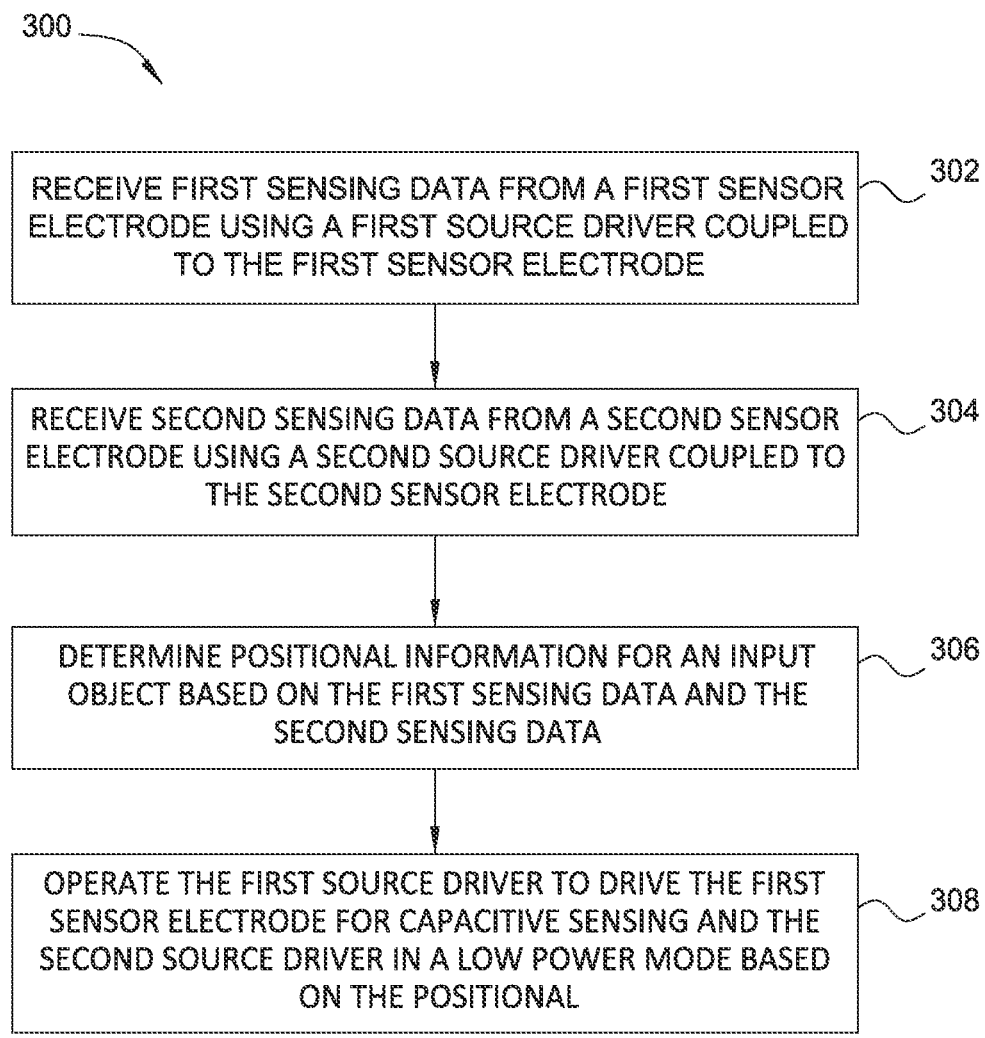
FIG. 3 is a flow diagram depicting a method for operating an input device, according to an embodiment.

FIG. 3 is a flow diagram depicting a method 300 for operating an input device. Method 300 begins at block 302, where the processing system 110 receives first sensing data from a first sensor electrode using a first source driver (e.g., 206-1) coupled to the first sensor electrode. At block 304, the processing system 110 receives second sensing data from a second sensor electrode using a second source driver (e.g., 206-2) coupled to the second sensor electrode. While the present technique is described in the context of a first source driver and a second source driver, it is understood that the described technique may be performed using, alone or in combination, any of the source drivers (e.g., 206-1 to 206-N) 302. In some embodiments, the first and second sensor electrodes each include at least one display electrode configured for display updating and capacitive sensing. In some embodiments, the plurality of sensor electrodes 204 are coupled to each of the first and second source drivers (e.g., 206-1, 206-2) and are simultaneously driven to obtain a coarse position of the input object 140. For example, in various embodiments, the plurality of sensor electrodes 204 may be simultaneously driven in an absolute capacitive sensing mode or a transcapacitive sensing mode. In other embodiments, the plurality of sensor electrodes 204 may be driven with a constant voltage to acquire an active pen signal. In some embodiments, the plurality of sensor electrodes 204 are disposed in a matrix array, as depicted in FIG. 2.

At block 306, the determination module 212 of the processing system 110 determines positional information for an input object 140 based on the first sensing data and the second sensing data. In some embodiments, the input object may be selected from the group consisting of a finger, a stylus, and an active pen.

The determination module 212 determines measurements based on resulting signals obtained by the sensor module 210. The measurements may comprise capacitance measurements that can include changes in capacitive couplings between elements (also referred to as "changes in capacitance"). For example, the determination module 212 can determine baseline measurements of capacitive couplings between elements without the presence of input object(s). The determination module 212 can then combine the baseline measurements of capacitive couplings with measurements of capacitive couplings in the presence of input object(s) to determine changes in capacitive couplings. In other embodiments, the measurements may comprise active pen measurements that include measurements of an active pen signal transmitted from an active pen or other external input device. As discussed above, the active pen measurements may be compared to a plurality of baseline measurements to determine changes due to the active pen signal.

In an example, the determination module 212 can determine a plurality of measurements associated with specific portions of the sensing region 120 as "pixels" to create an "image" or "frame." A pixel of an image represents a location within the sensing region 120 in which a measurement of the sensing data from a corresponding sensing elements of the sensor electrode pattern 202 can be determined. In various embodiments, the measurements are capacitive measurements, the "pixels" are "capacitive pixels" and the "image" or "frame" are a "capacitive image" or a "capacitive frame". In other embodiments, the measurements are active pen measurements, the "pixels" are "active pen pixels" and the "image" or "frame" are an "active pen image" or a "active pen frame". The capacitive image can be obtained using transcapacitive sensing (e.g., transcapacitive image), or obtained using absolute capacitive sensing (e.g., absolute capacitive image). For example, a capacitive pixel can correspond to a transcapacitive coupling between a sensor electrode (e.g., $204_{1,1}$) and another sensor electrode (e.g., $204_{1,2}$) affected by input object(s). In another example, a capacitive pixel can correspond to an absolute capacitance of a sensor electrode 204. The determination module 212 can determine an array of capacitive coupling changes using the resulting signals obtained by the sensor module 210 to produce an x-by-y array of capacitive pixels that form a capacitive image. In this manner, the processing system 110 can capture a capacitive image that is a snapshot of the response measured in relation to input object(s) in the sensing region 120. A given capacitive image can include all of the capacitive pixels in the sensing region, or only a subset of the capacitive pixels.

The active pen image can be obtained by holding the sensor electrodes at a substantially constant voltage while receiving resulting signals. As such, an active pen pixel may correspond to the effect of an active pen signal on a sensor electrode. A given active pen image can include all the active pen pixels or only a subset of the active pen pixels. In one or more embodiments a sensing frame may comprise any number of capacitive images and active pen images. In some embodiments, the number of capacitive images and the number of the active pen images differ. For example, the number of capacitive images may be greater than the number of active pen images or the number of active pen images may be greater than the number capacitive images. Further, processing system 110 may be configured to vary the number of capacitive images and/or the number active pen images from sensing frame to sensing frame. In various embodiments, a sensing frame may further include one or more interference frames, during which at least one sensor electrode is configured to listen for interference. For example, the sensor electrodes may be held at a constant voltage while resulting signals are received.

Figure 4:
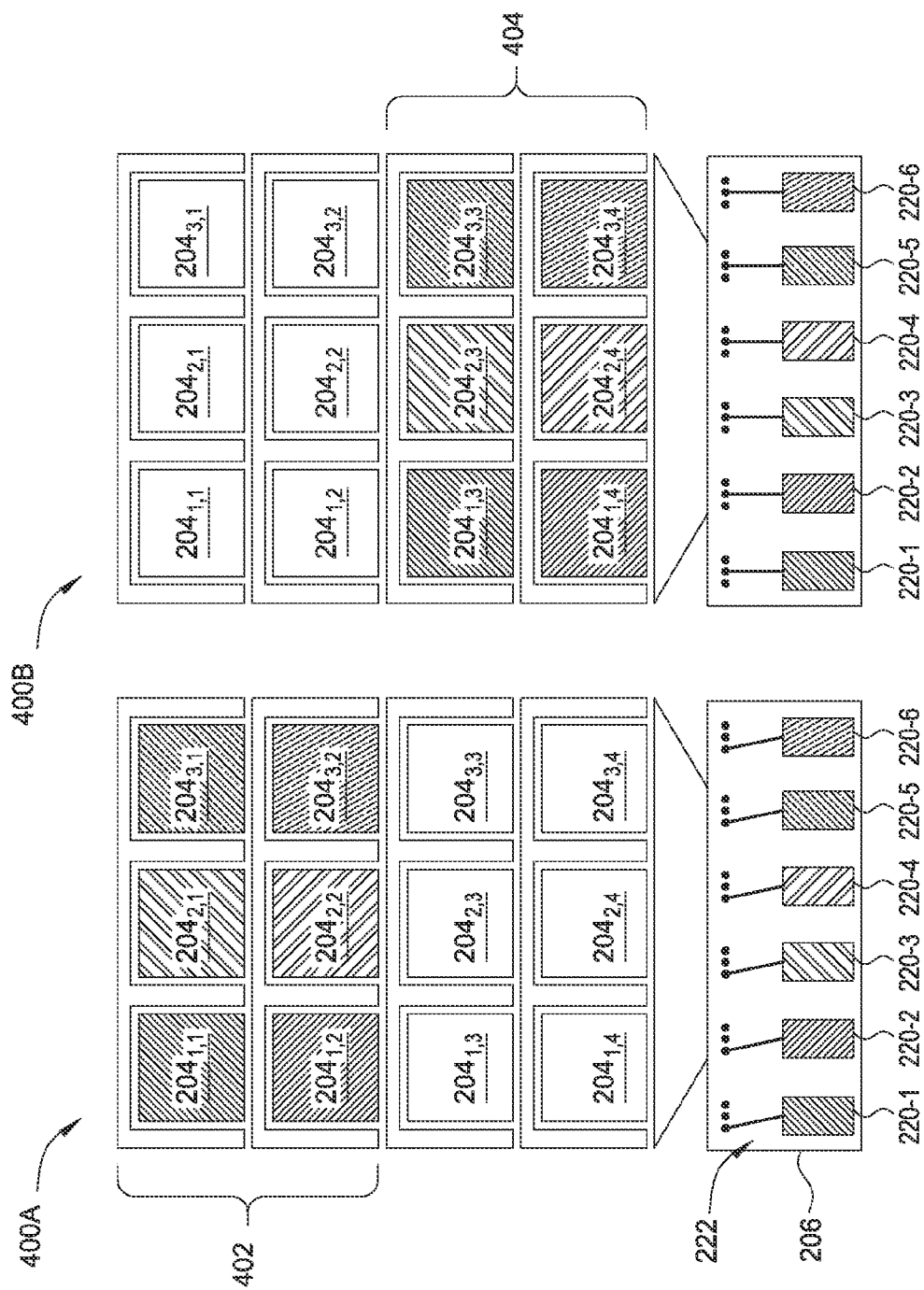
FIG. 4 is a block diagram depicting operations for a full screen acquisition of capacitive measurements, according to one embodiment of the present disclosure.

In one or more embodiments, the processing system 110 can acquire a full capacitive image of the sensing region 120 by scanning groups of sensor electrodes 204 that have been ganged together to form regular clusters of sensor electrodes. FIG. 4 depicts operations for a full screen acquisition of capacitive measurements, according to one embodiment of the present disclosure. In a first state 400A, the processing system 110 operates the selection circuitry 222 to couple a first cluster 402 of sensor electrodes to the plurality of receivers 220 within the source driver 206. In a second state 400B, the processing system 110 operates the selection circuitry to selectively decouple the receivers 220 from the first cluster 402 and couple the receivers 220 to a second cluster 404.

In many embodiments, the processing system 110 can acquire a full active pen image of the sensing region 120 by scanning groups of sensor electrodes 204 that have been ganged together to form regular clusters of sensor electrodes. Referring again to FIG. 4 depicts, the depicted embodiment may be used also applied to acquire a full screen acquisition of active pen measurements, according to one embodiment of the present disclosure. As described above, in a first state 400A, the processing system 110 operates the selection circuitry 222 to couple a first cluster 402 of sensor electrodes to the plurality of receivers 220 within the source driver 206 while holding the sensor electrodes at a constant voltage. In a second state 400B, the processing system 110 operates the selection circuitry to selectively decouple the receivers 220 from the first cluster 402 and couple the receivers 220 to a second cluster 404.

As mentioned earlier, each receiver 220 may be selectively coupled to one or more sensor electrodes with the selection circuitry 222, such as multiplexers. The selection circuitry 222 associated with a particular receiver 220 may be operated between a number of states. In some embodiments, a subset of the states of the selection circuitry 222 couples the receiver 220 to different sensor electrodes 204. For example, a first state couples the receiver 220-1 to one associated sensor electrode $204_{1,1}$, a second state couples the receiver 220-1 to a different associated sensor electrode $204_{1,3}$. In some embodiments, the different sensor electrodes associated with a receiver may be non-adjacent. In some embodiments, at least one of the states of the selection circuitry 222 couples the receiver 220 to an associated grid electrode 208. For example, a third state of the selection circuitry 222 couples the receiver 220-1 to the grid electrode $208_1$.

In some embodiments, the clusters 402, 404 are arranged as a full line shape spanning the capacitive sensor device. While two clusters are depicted in FIG. 4, it should be understood that the sensor electrode pattern shown in FIG. 4 can represent a portion of a larger sensor electrode pattern, and that additional clusters may be selectively formed to acquire sensing data that covers the entire sensing region 120, for example, 12 to 16 clusters. In the example depicted in FIG. 4, in the first state 400A, the selection circuitry 222 couples the receivers 220-1, 220-2, 220-3, 220-4, 220-5, 220-6 to the adjacent sensor electrodes $204_{1,1}$, $204_{1,2}$, $204_{2,1}$, $204_{2,2}$, $204_{3,1}$, $204_{2,3}$, respectively. In the second state 400B, the selection circuitry 222 couples the receivers 220-1 to 220-6 to a different set of adjacent sensor electrodes comprising the second cluster 404. For example, the selection circuitry 222 associated with the first receiver 220-1 decouples the sensor electrode $204_{1,1}$ from the receiver 220-1 and couples the sensor electrode $204_{1,3}$ to the receiver 220-1 for receiving sensing data from sensor electrode $204_{1,3}$.

In another example, the determination module 212 can perform a plurality of measurements associated with a particular axis of the sensing region 120 to create a "profile" along that axis. For example, the determination module 212 can determine an array of absolute capacitive coupling changes along an axis defined by the sensor electrodes $204_{X,Y}$ and/or the sensor electrodes $204_{X+1,Y}$ to produce capacitive profile(s). The array of capacitive coupling changes can include a number of points less than or equal to the number of sensor electrodes along the given axis. In another example, the determination module 212 can determine an array of measurements corresponding to an active pen signal along an axis defined by the sensor electrodes $204_{X,Y}$ and/or the sensor electrodes $204_{X+1,Y}$ to produce active pen profile(s). The array can include a number of points less than or equal to the number of sensor electrodes along the given axis.

Figure 5:
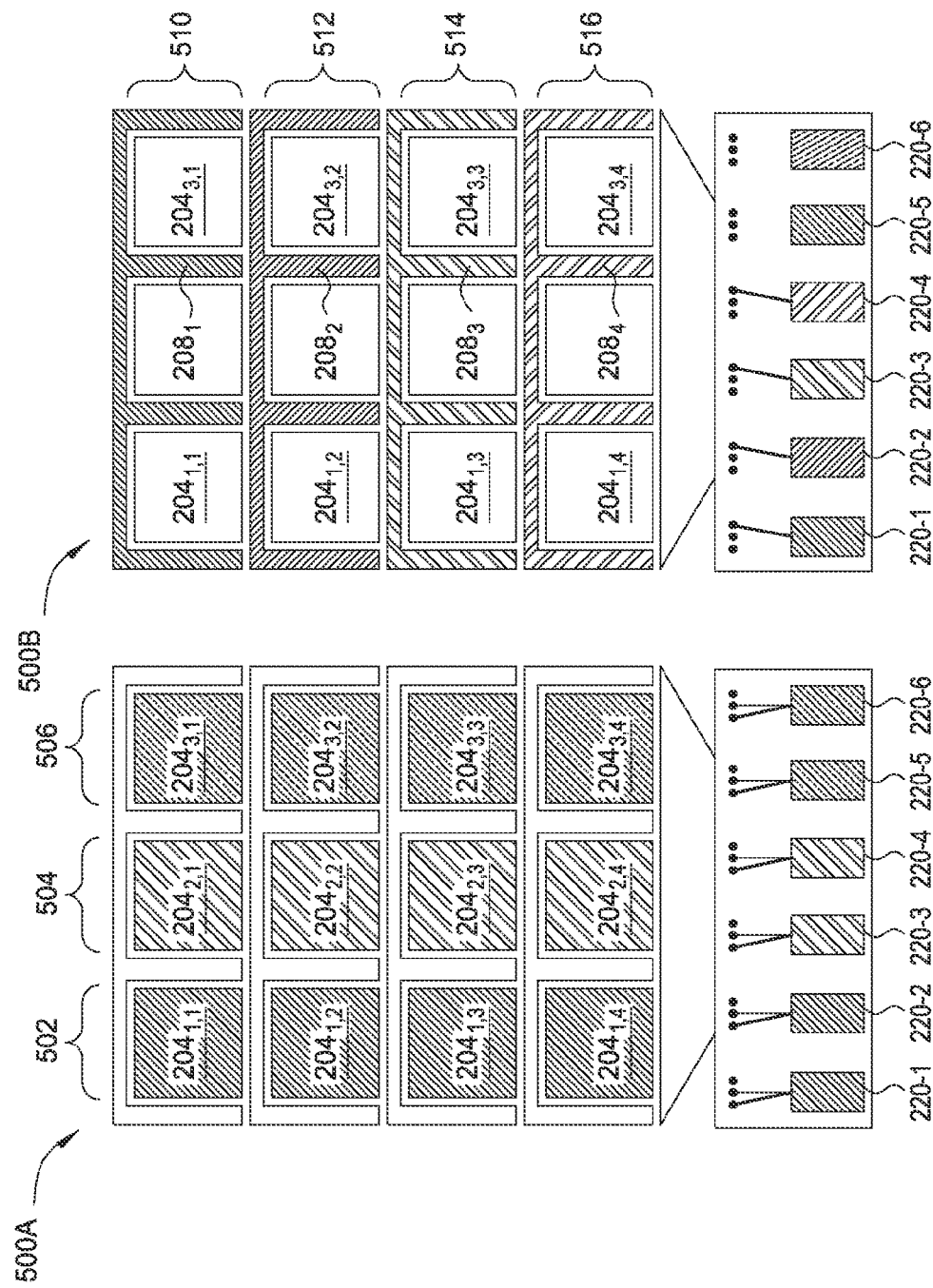
FIG. 5 is a block diagram depicting operations for profile acquisitions of capacitive measurements, according to one embodiment of the present disclosure.

FIG. 5 depicts operations for profile acquisitions of measurements, according to one embodiment of the present disclosure. To emulate X/Y profile acquisitions, the selection circuitry 222 is configured to acquire full columns in one cluster. Because, in some implementations, a receiver 220 might only be connected to a few sensor electrodes, the full columns may be acquired by multiple receivers 220 that will be added together to form a profile, e.g., a horizontal profile 500A.

For example, to acquire a horizontal profile 500A, the determination module 212 can determine measurements along a first column 502 defined by the sensor electrodes $204_{1,1}$, $204_{1,2}$, $204_{1,3}$, $204_{1,4}$. The selection circuitry 222 can be operated to couple both sensor electrodes $204_{1,1}$ and $204_{1,3}$ to the first receiver 220-1, and to couple both sensor electrodes $204_{1,2}$ and $204_{1,4}$ to the second receiver 220-2. The determination module 212 can determine positional information for an input object based on sensing data received from the first column 502 using the receivers 220-1 and 220-1 together. Similar operations may be performed to obtain sensing data from a second column 504 of sensor electrodes using the receivers 220-3 and 220-4, and sensing data from a third column 506 using the receivers 220-5 and 220-6 together.

To acquire a vertical profile 500B, the determination module 212 can determine measurements along a first row 510 defined by the grid electrode $208_1$. The selection circuitry 222 can be operated to a state that couples the grid electrode $208_1$ to the first receiver 220-1, and the determination module 212 can determine positional information for an input object based on sensing data received from the first row 510 using the receiver 220-1. Similar operations may be performed to obtain sensing data from a second row 512 of sensor electrodes using the receiver 220-2, sensing data from a third row 514 using the receiver 220-3, and sensing data from a fourth row 516 using the receiver 220-4. It is noted that depending on the configuration of the capacitive sensor device 200 and the arrangement of sensor electrodes, grid electrodes, and receivers, some of the receivers 220 may be unused during acquisition of the horizontal and/or vertical profiles. For example, as depicted in FIG. 5, the fifth and sixth receivers 220-5 and 220-6 are not used to acquire the vertical profile 500B and have been decoupled from the sensor electrode pattern. In embodiments not comprising grid electrodes, the sensor electrodes may be coupled to receivers in such a way to acquire measurements along a row of sensor electrodes. The row sensor electrodes may span across the sensor region or only along a portion of the sensor region. In such embodiments, multiple profile acquisitions may be added together in firmware to reconstitute the vertical profile.

In some embodiments, the grid electrodes 208 may extend across the entire span of the capacitive sensor device 200. However, in other embodiments, the grid electrodes 208 may be partitioned at boundaries defined by source drivers 206 to reduce the load and electrode size. In such embodiments, multiple profile acquisitions may be added together in firmware to reconstitute the vertical profile. While the columns 502, 504, 506 are referred to as part of a horizontal profile 500A and rows 510, 512, 514, 516 are referred to as part of a vertical profile 500B, it is understood that the terms "horizontal" or "vertical" are by convention and may be interchanged based on a different configuration or orientation of the capacitive sensor device 200.

In various embodiments, the profiles along each axis may be acquired using an absolute capacitive sensing mode and also using an active pen sensing mode. In other embodiments, profiles may be acquired along each axis using only one of an absolute capacitive sensing mode or an active pen sensing mode.

FIG. 6 depicts operations for focus acquisitions of measurements, according to one embodiment of the present disclosure. In one or more embodiments, the selection circuitry 222 is configured to acquire a cluster 602 with a substantially similar or same shape as clusters 402, 404 (described in conjunction with FIG. 4) and that is arranged in between the clusters 402, 404. For example, the processing system 110 operates the selection circuitry 222 to couple a first cluster 602 (comprised of sensor electrodes $204_{1,1}$, $204_{1,2}$, $204_{2,1}$, $204_{2,2}$, $204_{3,1}$, $204_{2,3}$) to the plurality of receivers 220 within the source driver 206. In one or more embodiments, the processing system 110 is configured to operate the selection circuitry 222 to acquire sensing data from any consecutive set of clusters, lines, or groupings of sensor electrodes 204. The processing system 110 may operate the selection circuitry 222 to acquire sensing data from a first cluster 402, then a second cluster 602, and then a third cluster 404, thereby providing a flexible capacitive sensing architecture.

In one embodiment, rather than toggle the selection circuitry 222 all be in the same state (e.g., all in a first state), the processing system 110 may operate the selection circuitry 222 to be in mixed states that couple the receivers 220 to the appropriate sensor electrodes needed to form the cluster 602. In the example depicted, the processing system 110 toggles the selection circuitry 222 associated with the first receiver 220-1 to the second state (depicted as the middle coupling), toggles the selection circuitry 222 associated with the second receiver 220-2 to the first state (depicted as the left coupling), and so forth.

Referring back to FIG. 3, at block 308, the determination module 212 of the processing system 110 operates the first source driver to drive the first sensor electrode for input sensing and the second source driver in a low power mode based on the positional information. By selectively operating certain source drivers in a low power mode, embodiments of the present disclosure reduce the overall power consumption of the capacitive sensor device 200 and improve battery life, while maintaining a similar capacitive sensing performance level than without the power saving scheme.

FIG. 7 is a block diagram depicting a power-saving scheme for operating the capacitive sensor device 700, according to an embodiment of the present disclosure. The capacitive sensor device 700 is configured similar to the capacitive sensor device 200 described with FIG. 2. The capacitive sensor device 700 includes a plurality of source drivers 206 (e.g., 206-1, 206-2, etc.) and the processing system 110. In one embodiment, the sensor electrodes 204 of the capacitive sensor device 700 are partitioned into a plurality of regions 702 (e.g., 702-1, 702-2, etc.) such that each source driver is responsible for input sensing and display updating within that corresponding region. For example, the first source driver 206-1 is responsible for input sensing and display updating using the columns of sensor electrodes 204 and display electrodes within the first region 702-1. Similar divisions of labor are organized for regions 702-2 (which corresponds to the second source driver 206-2), and regions 702-3 and 702-4.

In various embodiment, the processing system 110 may be configured to acquire a course image of the entire or a portion of the sensing region. For example, in one embodiment, source drivers 206-1, 206-2, 206-3 and 206-4 may simultaneously receiver resulting signals with all or at least a portion of the corresponding sensor electrodes. The determination module may be configured to determine first positional information for an input object based on the resulting signals and based on the first positional information, one or more of the source drivers may be may be operated in a low power mode while one or more source drivers may in an active mode. In an example, an input object may be determined to be proximate region 702-2 and not sensing regions 702-1, 702-3 and 702-4. The processing system 110 may operate the selection circuitry to couple sensor electrodes that form a cluster 704 to receivers in the source driver 206-2 and receives sensing data from the cluster 704. The processing system 110 determines second positional information indicating presence of an input object (depicted as circle 706) proximate to the cluster 704 of sensor electrodes based on the sensing data. That is, the processing system 110 determines that input object is proximate to sensor electrodes within the region 702-2 and not proximate to sensor electrodes within the region 702-1. As such, the processing system 110 may continue to operate the source driver 206-2 to drive sensor electrodes of the cluster 704 for capacitive sensing, and operate the source driver 206-1 in a low power mode (as depicted by a shaded fill pattern). Similar determinations may be made to operate the source drivers 206-3 and 206-4 in the low power mode. In some embodiments, operating the source driver in the low power mode includes lowering a sensing frame rate of the second sensor electrode (sensor electrodes within region 702-1) relative to the first sensor electrode (i.e., sensor electrodes within region 702-2). In some schemes, the sensing rate may be modified in terms of multiples or fractions of a particular sensing rate (e.g., 0.75×, 0.5×, 1×). In other embodiments, operating the source driver in the low power mode may include entering a sleep mode or suspended mode of operation of a source driver. In another embodiment, a first input object may be determined to be proximate a first source driver and a second input object may be determined to be proximate a second source driver. In such an embodiment, the first and second source drivers may be operated in an active state while a third source driver (and fourth is present) may be operated in a low power mode.

In one embodiment, the processing system 110 is configured to acquire active pen images and capacitive images. The processing system 110 first operates the sensor electrodes to acquire an active pen image and to acquire a capacitive image. If an active pen is determined to be proximate one or more sensing regions, the corresponding source drivers may be configured to acquire more active pen images than capacitive images. In one embodiment, a finger (or other passive input object) may be determined to be proximate to sensor electrodes corresponding to a first source driver and an active pen may be determined to be proximate to sensor electrodes corresponding to a second source driver. The first source driver may be configured to acquire more capacitive images than active pen images and the second source driver may be configured to acquire more active pen images than capacitive images. Further, processing system 110 may acquire a course capacitive image and a course active pen image for each sensing region on a regular basis to determine if a new input object has arrived proximate to sensor electrodes associated with source drivers that are in a low power mode or if new input objects have arrived in sensing regions corresponding to source drivers in an active mode. In some embodiments, while a source driver may be configured to sense within a specific portion of a sensing region to determine precise positional information, the source driver may also be configured to acquire a course image of the sensing region outside of the specific portion. Further, once a determination has been made that an input object has left a sensing region, the corresponding source driver(s) may be placed into a low power mode. In some embodiments, based upon a determination that an input object has left the sensing region, a course image (e.g., capacitive image and/or active pen image) of the sensing region may be acquired before placing the source driver in a low power mode.

In one embodiment, the processing system 110 may receive additional sensing data from the sensor electrode(s) coupled to the source driver 206-1 operating in the lower power mode periodically to determine whether the input object 706 is proximate to those sensor electrodes. In some embodiments, the processing system 110 may temporarily raise the sensing frame rate of sensor electrodes in the region 702-1. The sensing frame may be any combination of active pen frames and capacitive frames. Responsive to determining that the input object 706 is proximate to a sensor electrode within the region 702-1, the processing system 110 may operate the source driver 206-1 at full power. For example, the processing system 110 may raise the capacitive sensing frame rate to other source drivers (e.g., 206-2).

In a further example, responsive to determining that the input object 706 has moved from a sensor electrode (e.g., $204_{1,4}$) within the region 702-2 associated with the source driver 206-2 to another sensor electrode (e.g., $204_{1,3}$) within the region 702-1 associated with the source driver 206-1, the determination module 212 of the processing system 110 may selectively operate the source driver 206-2 in a low power mode while operating the other source driver 206-1 to drive for capacitive sensing. As such, processing system 110 may be configured to move a source driver from a low power mode to an active mode (full power mode) based on positional information determined from resulting signals received from a different source driver.

In some embodiments, the processing system 110 is configured to drive the grid electrode 208 to determine a proximate location of the input object and determine which source driver to not operate in a low power mode. The processing system 110 may operate the grid electrode to acquire a vertical profile as described earlier in conjunction with FIG. 5.

Figure 8:
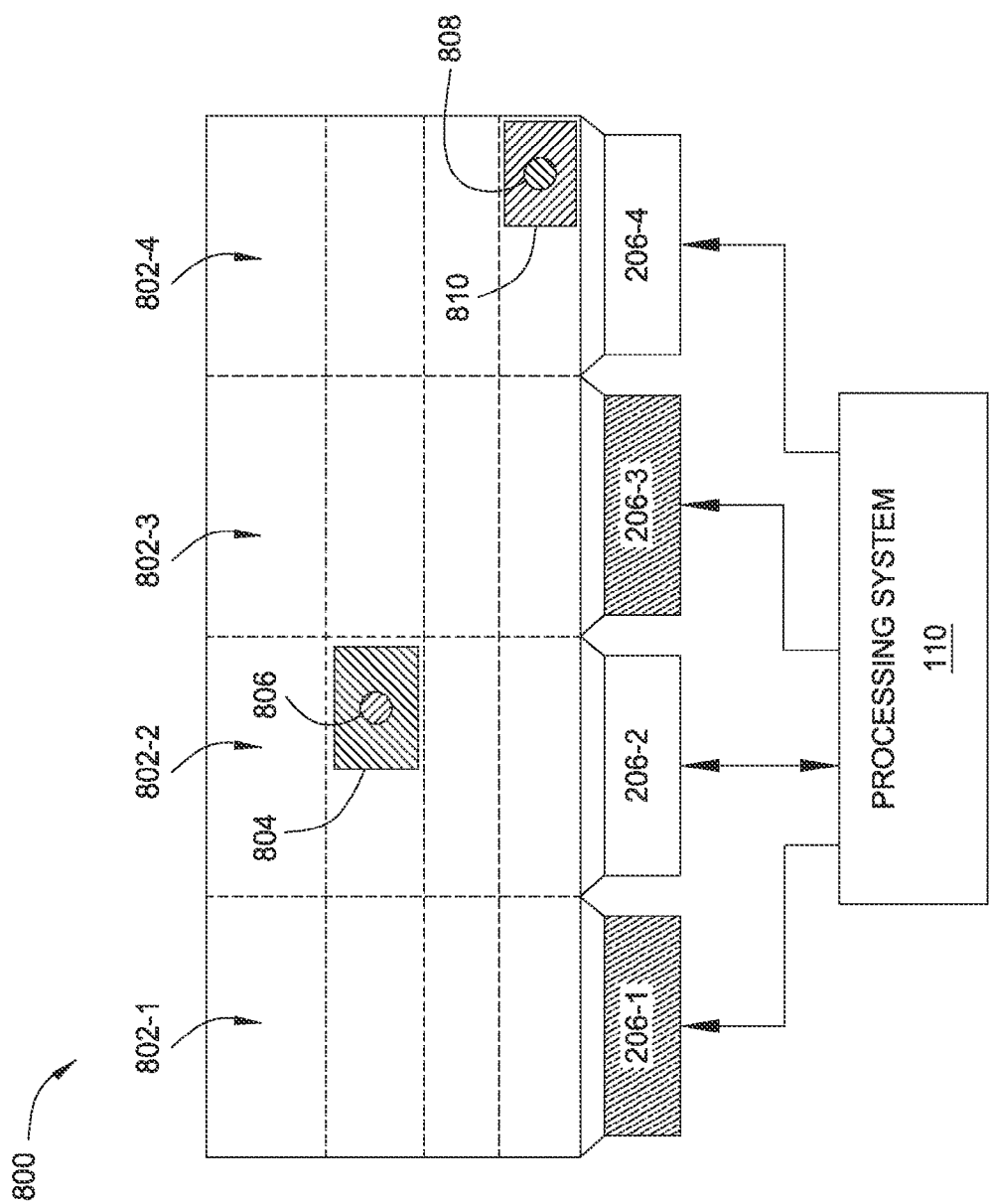
FIG. 8 is a block diagram depicting another power-saving scheme for operating the capacitive sensor device, according to another embodiment of the present disclosure.

FIG. 8 is a block diagram depicting a power-saving scheme for operating the capacitive sensor device 800, according to another embodiment of the present disclosure. The capacitive sensor device 800 includes a plurality of source drivers 206 (e.g., 206-1, 206-2, 206-3, 206-4, although other numbers of source drivers may be used) and the processing system 110. In one embodiment, the sensor electrodes 204 of the capacitive sensor device 800 are partitioned into a plurality of regions 802 (e.g., 802-1, 802-2, etc.) such that each source driver is responsible for capacitive sensing and display updating within that corresponding region. For example, the first source driver 206-1 is responsible for capacitive sensing and display updating using the columns of sensor electrodes 204 and display electrodes within the first region 802-1. Similar divisions of labor are organized for regions 802-2 (which corresponds to the second source driver 206-2), and regions 802-3 and 802-4.

The capacitive sensor device 800 may be configured similar to the capacitive sensor device 700 described with FIG. 7, except that the capacitive sensor device 800 is configured to support a multi-zoom scenario and partial low-power mode in each individual source driver 206. FIG. 8 depicts the capacitive sensing operation that "zooms" in at different locations at once, e.g., at a first cluster 804 and a second cluster 810. In one embodiment, the processing system 110 operates the selection circuitry to couple sensor electrodes that form a first cluster 804 within region 802-2 to receivers in the source driver 206-2 and receives sensing data from the cluster 804, and operates selection circuitry to couple sensor electrodes that form a second cluster 810 within region 802-4 and receives sensing data from the second cluster 810. Furthermore, the processing system 110 is configured to operate the source driver 206-2 in a partial low power mode that includes lowering a capacitive sensing frame rate on those columns within the source driver 206-1 that are not affected by the touch input. Similarly, the processing system 110 is configured to operate the other source driver 206-4 in the partial low power mode for those columns coupled to the source driver 206-4 that do not correspond to the partial cluster 810 within the region 802-4. As depicted in FIG. 8, the source drivers 206-1 and 206-3 are operated in a complete low-power mode, as described earlier.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

What is claimed is:

1. An integrated display device and capacitive sensing device comprising:
   a plurality of sensor electrodes, each of the plurality of sensor electrodes comprising at least one display electrode configured for display updating and capacitive sensing;
   a processing system comprising:
      a first source driver coupled to a first sensor electrode of the plurality of sensor electrodes and configured to receive first sensing data from the first sensor electrode, and a second source driver coupled to a second sensor electrode of the plurality of sensor electrodes and configured to receive second sensing data from the second sensor electrode;

wherein the processing system is configured to determine positional information for an input object based on the first sensing data and the second sensing data, and operate the first source driver to drive the first sensor electrode for capacitive sensing and the second source driver in a low power mode based on the positional information.

2. The integrated display device and capacitive sensing device of claim 1, wherein the input object is selected from the group consisting of a finger and an active pen.

3. The integrated display device and capacitive sensing device of claim 1, wherein the plurality of sensor electrodes are coupled to each of the first and second source drivers and are simultaneously driven to obtain a coarse position of the input object.

4. The integrated display device and capacitive sensing device of claim 1, wherein the processing system is further configured to:

responsive to determining that the input object moved from the first sensor electrode to the second sensor electrode, operate the first source driver in a low power mode while operating the second source driver to drive for capacitive sensing.

5. The integrated display device and capacitive sensing device of claim 1, wherein the first and second source drivers are configured to acquire one or more active pen images and capacitive images, wherein the first source driver is configured to, responsive to determining that a passive input object is proximate to the first sensor electrode, acquire more capacitive images than active pen images, and wherein the second source driver is configured to, responsive to determining that an active pen is proximate to the second sensor electrode, acquire more active pen images than capacitive images.

6. The integrated display device and capacitive sensing device of claim 1, wherein the plurality of sensor electrodes include at least one grid electrode disposed between the plurality of sensor electrodes, and wherein the processing system is configured to drive the grid electrode to determine a proximate location of the input object and determine which source driver to not operate in a low power mode.

7. The integrated display device and capacitive sensing device of claim 1, wherein the operating the source driver in the low power mode comprises:

lowering a capacitive sensing frame rate of the second sensor electrode relative to the first sensor electrode.

8. A processing system for an integrated display device and capacitive sensing device, the processing system comprising:

a first source driver coupled to a first sensor electrode of a plurality of sensor electrodes and configured to receive first sensing data from the first sensor electrode;

a second source driver coupled to a second sensor electrode of a plurality of sensor electrodes and configured to receive second sensing data from the second sensor electrode; and a determination module configured to determine positional information for an input object based on the first sensing data and the second sensing data, and operate the first source driver to drive the first sensor electrode for capacitive sensing and the second source driver in a low power mode based on the positional information.

9. The processing system of claim 8, wherein the input object is selected from the group consisting of a finger and an active pen.

10. The processing system of claim 8, wherein the plurality of sensor electrodes are coupled to each of the first and second source drivers and are simultaneously driven to obtain a coarse position of the input object.

11. The processing system of claim 8, wherein the determination module is further configured to:

responsive to determining that the input object moved from the first sensor electrode to the second sensor electrode, operating the first source driver in a low power mode while operating the second source driver to drive for capacitive sensing.

12. The processing system of claim 8, wherein the first and second source drivers are configured to acquire one or more active pen images and capacitive images, wherein the first source driver is configured to, responsive to determining that a passive input object is proximate to the first sensor electrode, acquire more capacitive images than active pen images, and wherein the second source driver is configured to, responsive to determining that an active pen is proximate to the second sensor electrode, acquire more active pen images than capacitive images.

13. The processing system of claim 8, wherein the plurality of sensor electrodes include at least one grid electrode disposed between the plurality of sensor electrodes, and wherein the determination module is configured to drive the grid electrode to determine a proximate location of the input object and determine which source driver to not operate in a low power mode.

14. The processing system of claim 8, wherein the determination module configured to operate the second source driver in the low power mode is further configured to lower a capacitive sensing frame rate of the second sensor electrode relative to the first sensor electrode.

15. A method for operating an input device, the method comprising:

receiving first sensing data from a first sensor electrode using a first source driver coupled to the first sensor electrode;

receiving second sensing data from a second sensor electrode using a second source driver coupled to the second sensor electrode, wherein the first and second sensor electrodes each comprise at least one display electrode configured for display updating and capacitive sensing;

determining positional information for an input object based on the first sensing data and the second sensing data; and operating the first source driver to drive the first sensor electrode for capacitive sensing and the second source driver in a low power mode based on the positional information.

16. The method of claim 15, wherein the plurality of sensor electrodes are coupled to each of the first and second source drivers and are simultaneously driven to obtain a coarse position of the input object.

17. The method of claim 15, further comprising:

responsive to determining that the input object moved from the first sensor electrode to the second sensor electrode, operating the first source driver in a low power mode while operating the second source driver to drive for capacitive sensing.

18. The method of claim 15, wherein the plurality of sensor electrodes include at least one grid electrode disposed between the plurality of sensor electrodes, and wherein the method further comprises:
- driving the grid electrode to determine a proximate location of the input object and determine which source driver to not operate in a low power mode.

19. The method of claim 15, wherein the operating the source driver in the low power mode comprises:
- lowering a capacitive sensing frame rate of the second sensor electrode relative to the first sensor electrode.

20. The method of claim 15, further comprising:
- receiving additional sensing data from the second sensor electrode coupled to the second source driver operating in the low power mode periodically to determine whether the input object is proximate to the second sensor electrode; and
- responsive to determining that the input object is proximate to the second sensor electrode, operating the second source driver at full power.

* * * * *